Feb. 24, 1931.　　　K. ZASTAWSKI　　　1,794,049
AUTOMOBILE DIRECTION SIGNAL
Filed Oct. 24, 1928　　　2 Sheets-Sheet 1
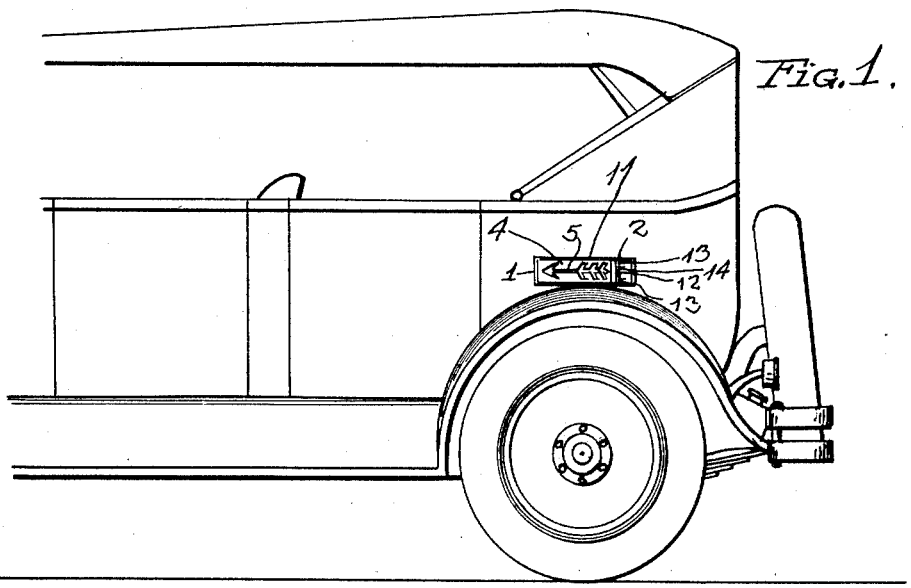
Fig.1.
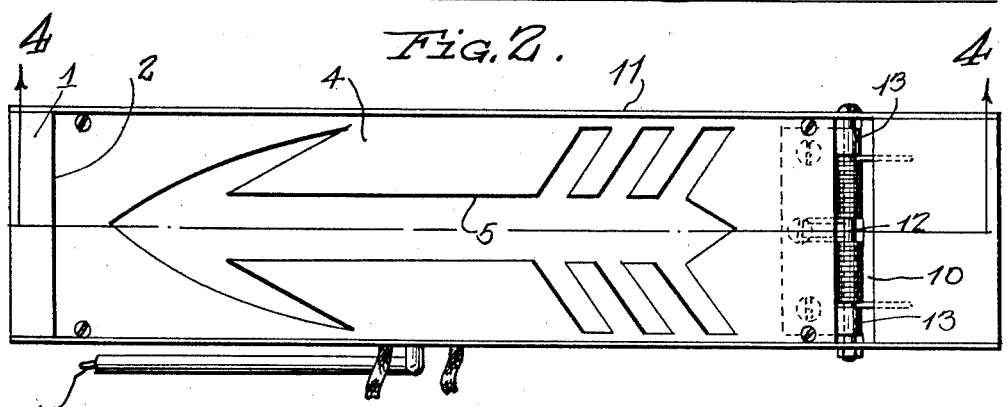
Fig.2.
Fig.3.
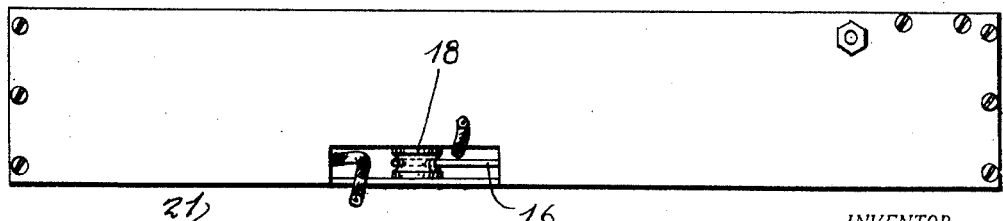
Fig.8.
INVENTOR.
Kazimiesz Zastawski.
BY Bryant & Lowry
ATTORNEYS Feb. 24, 1931. K. ZASTAWSKI 1,794,049
AUTOMOBILE DIRECTION SIGNAL
Filed Oct. 24, 1928  2 Sheets-Sheet 2
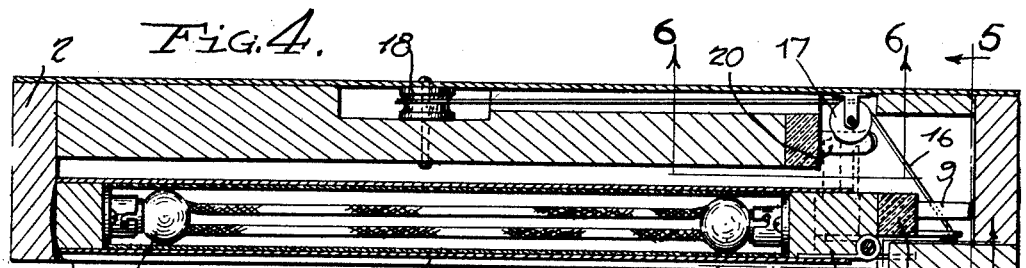
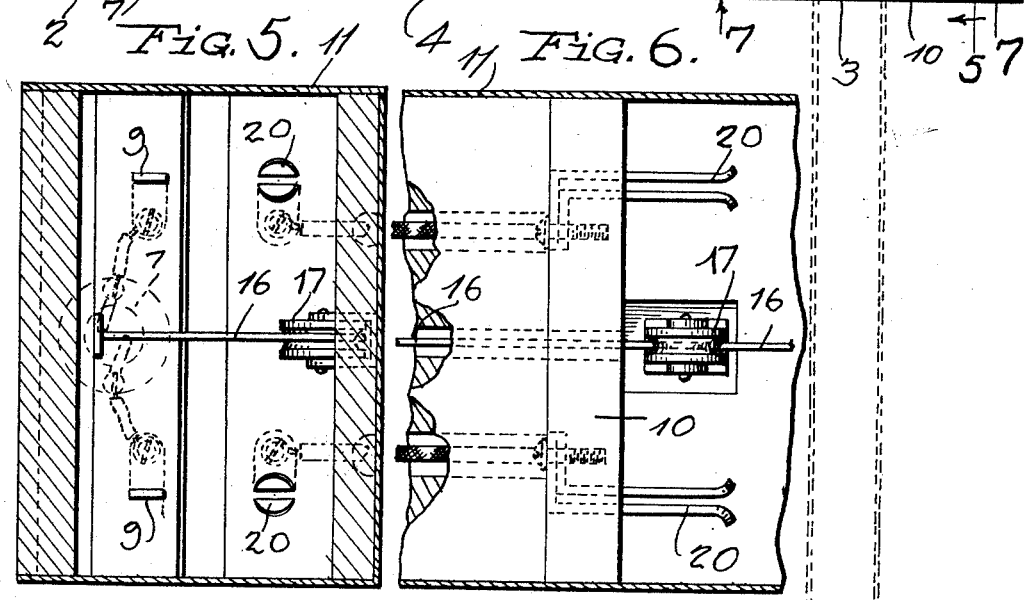
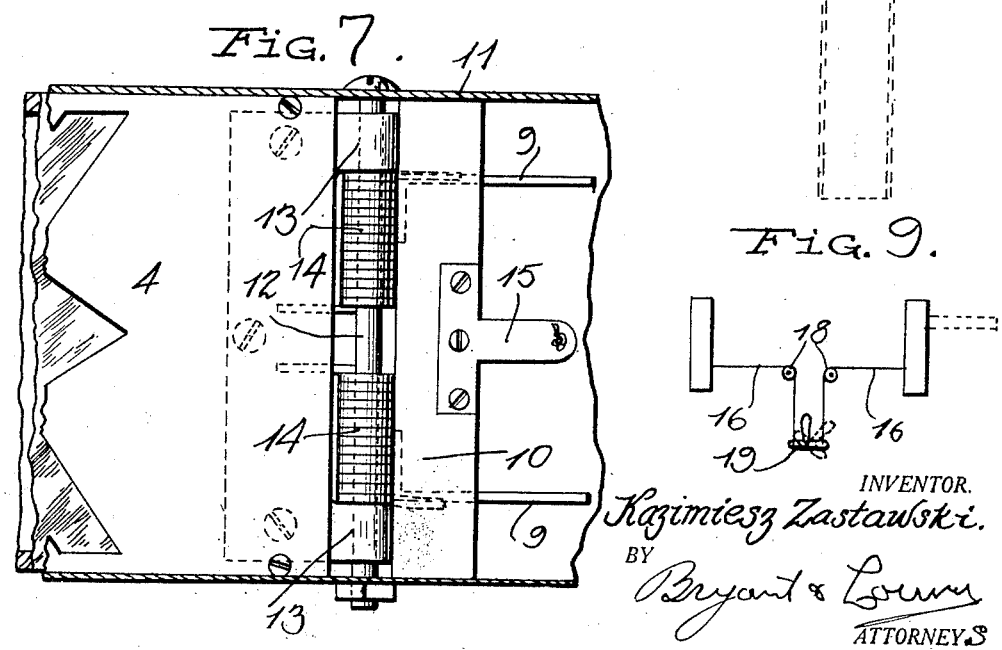
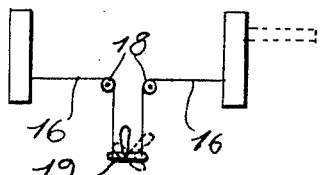
INVENTOR.
Kazimiesz Zastawski.
BY Bryant & Lowry
ATTORNEYS Patented Feb. 24, 1931

1,794,049

UNITED STATES PATENT OFFICE

KAZIMIESZ ZASTAWSKI, OF BALTIMORE, MARYLAND

AUTOMOBILE DIRECTION SIGNAL

Application filed October 24, 1928. Serial No. 314,772.

This invention relates to a signal especially adapted to be used upon an automobile machine and it consists in the novel features hereinafter described and claimed.

An object of the invention is to provide an electrically illuminated signal adapted to be positioned one at each side of the body of the automobile machine and having panels adapted to be swung outwardly beyond the surface of the body and simultaneously illuminated so that pedestrians or traffic upon the highway may be warned as to the direction in which the automobile machine equipped with the signaling apparatus is about to make a turn.

With this object in view the signaling device includes a panel which is pivotally mounted and set in the side of the body of the machine. Means are provided for swinging the said panel from a closed position to an open position and spring means are provided for automatically returning the panel from an open position to a closed position. The swinging means is so arranged and mounted that the same means may operate the panels which are located one at each side of the body. That is to say, when the handle of the swinging means is turned in one direction the panel at the same side of the body is swung outwardly and when the handle of the swinging means is turned in an opposite direction the panel at the corresponding side of the body is swung to its outward position.

When the panels are swung to the extended positions they automatically close electric circuits which include bulbs housed in the panels and the said bulbs are located within transparencies provided upon the panels, the said transparencies being preferably in the form of arrows and serve to indicate the direction in which the automobile machine is about to make a turn when the panels are extended.

In the accompanying drawings:—

Figure 1 is a fragmentary side elevational view of the rear portion of an automobile machine with the signal applied;

Figure 2 is an enlarged side elevational view of the signal detached from the body of the automobile machine;

Figure 3 is a top plan view of the signal;

Figure 4 is a horizontal sectional view of the signal cut on the line 4—4 of Figure 2;

Figure 5 is a transverse sectional view of the signal cut on the line 5—5 of Figure 4;

Figure 6 is a fragmentary sectional view of the signal cut on the line 6—6 of Figure 4;

Figure 7 is a fragmentary sectional view of the signal cut on the line 7—7 of Figure 4;

Figure 8 is a diagrammatic view of the circuit used in the signal;

Figure 9 is a diagrammatic plan view of means employed for swinging the panels of the signals.

The body 1 of the automobile machine is provided at its rear portion and at its opposite sides with recesses 2. Each signal includes a panel 3 in the form of a frame having at its sides plates 4.

The said plates 4 are provided with openings 5 preferably in the form of arrows. Transparencies 6 are disposed over the openings 5 and may be of any suitable color, preferably red. Bulbs 7 are housed in the panels between the plates 4 and the transparencies 6 and the said bulbs are electrically connected by wiring 8. The wiring 8 also connects with terminals 9 mounted at the rear end of the panel upon a block 10 of insulating material.

A casing 11 is inserted within the side of the body of the automobile machine and a hinge pin 12 passes through the upper and lower sides of the casing. A hinge leaf 13 is fixed to the panel and is hingedly mounted upon the pin 12. Springs 14 are coiled around the hinge pin 12 and the said springs have their extremities embedded one end in the block 10 and the other ends disposed against the side of the panel 4 or inserted within the end of the panel 4. The springs 14 serve as means for automatically swinging or returning the panel from an open to a closed position within the casing 11. A lug 15 is mounted upon the block 10 and a pull cord 16 is connected at one end with the lug 15. The said cord is trained around a pulley 17 journaled within the side of the body of the automobile machine and passes under a pulley 18 and is connected with one end of a lever 19 pivotally mounted upon the instrument board of the machine or in the vicinity of the steering wheel. The pull cord 16 at one side of the body is connected with one end to the lever 19 and the pull cord 16 at the opposite side is connected with the other end of the lever 19. Contact terminals 20 are mounted within the recess 2 and are located in the paths of movement of the terminals 9. The contact terminals 20 are connected by means of wiring 21 with a battery 22.

When the operator of the automobile machine is about to make a turn he grasps the handle of the lever 7 and turns the said handle in the direction in which he is about to make the turn. Thus the pull cord at one side of the body of the machine is moved longitudinally over the pulleys 18 and 17 and inasmuch as the said cord 16 is connected with the lug 15 the panel 4 at the same side of the machine as that toward which the handle of the lever 19 is turned, is swung from a closed to an open position and is moved out of the recess 2 and beyond the edge of the casing 11 so that the said panel approximately is positioned at a right angle to the side of the body of the automobile machine as indicated by the dotted lines in Figure 4 of the drawing. When said panel is swung as just described the terminals 9 enter between the contact terminals 20 and thus an electric circuit from the battery 22 to the bulb 7 over the wiring 21 and 8 is completed and the said bulbs 7 are illuminated. Thus the transparencies 6 are illuminated and the rays of light from the bulbs passing through the said transparencies serve as means for warning pedestrains and the traffic as to the direction in which the automobile machine upon which the apparatus is mounted is about to make a turn.

As soon as the operator releases his grasp from the lever 19, the springs 14 upon that panel which has been swung outwardly promptly return the said panel to closed position whereby the electric circuit is broken and the bulbs are darkened and the panel is returned to its normal position within the casing 11 and the recess 2.

Having described the invention what is claimed is:—

1. An automobile direction signal adapted for mounting in a cavity in the side of a motor vehicle and comprising an open front casing, a panel, adapted for illumination, mounted for movement into and out of the casing, said panel being of rectangular form in elevation and including vertical end blocks, spaced stenciled direction plates anchored at their ends to the blocks, a vertical pivot pin mounting for one of the end blocks, a lug extending outwardly from the pivot block in alinement with the panel and a pull cord located in the bottom of the casing with a guide pulley opposite the pivot block whereby a pull on the cord will move the panel outwardly of the casing and at right angles to the vehicle and spring means associated with the block pivot for returning the panel to the casing.

2. An automobile direction signal adapted for mounting in a cavity in the side of a motor vehicle and comprising an open front casing, a panel, adapted for illumination, mounted for movement into and out of the casing, said panel being of rectangular form in elevation and including vertical end blocks, spaced stenciled direction plates anchored at their ends to the blocks, a vertical pivot pin mounting for one of the end blocks, a lug extending outwardly from the pivot block in alinement with the panel and a pull cord located in the bottom of the casing with a guide pulley opposite the pivot block whereby a pull on the cord will move the panel outwardly of the casing and at right angles to the vehicle, spring means associated with the block pivot for returning the panel to the casing, signal lamps in the panel in communication with a source of electrical energy and spaced contacts, one contact projecting from the outer side of the pivoted block and the other contact mounted in the bottom of the casing in the path of movement of the aforesaid contact whereby the lamps are illuminated upon outwardly swinging movement of the panel.

In testimony whereof I affix my signature.

KAZIMIESZ ZASTAWSKI.